(12) United States Patent
Morrow et al.

(10) Patent No.: US 7,575,179 B2
(45) Date of Patent: Aug. 18, 2009

(54) RECONFIGURABLE PROGRAMMABLE THERMOSTAT

(75) Inventors: Benjamin V. Morrow, West Monroe, NY (US); Ronald B. Kadah, Fayetteville, NY (US)

(73) Assignee: International Contols and Measurments Corp., North Syracuse, NY (US)

( * ) Notice: Subject to any disclaimer, the term of this patent is extended or adjusted under 35 U.S.C. 154(b) by 341 days.

(21) Appl. No.: 11/408,291

(22) Filed: Apr. 22, 2006

(65) Prior Publication Data

US 2007/0246553 A1  Oct. 25, 2007

(51) Int. Cl.
*B64D 13/00* (2006.01)
*G05D 23/00* (2006.01)

(52) U.S. Cl. ............... 236/91 D; 236/94; 236/51
(58) Field of Classification Search ............ 62/158; 236/1 C, 91 D, 46 R, 94, 51
See application file for complete search history.

(56) References Cited

U.S. PATENT DOCUMENTS

| | | | |
|---|---|---|---|
| 4,308,911 A * | 1/1982 | Mandl | 165/209 |
| 4,386,649 A | 6/1983 | Hines et al. | |
| 4,948,044 A * | 8/1990 | Cacciatore | 236/46 R |
| 5,181,653 A * | 1/1993 | Foster et al. | 236/49.3 |
| 5,395,042 A | 3/1995 | Riley et al. | |
| 5,573,180 A * | 11/1996 | Werbowsky et al. | 236/46 R |
| 5,873,519 A * | 2/1999 | Beilfuss | 236/46 R |
| 5,959,539 A * | 9/1999 | Adolph et al. | 340/3.5 |
| 6,017,192 A * | 1/2000 | Clack et al. | 417/18 |
| 6,597,275 B2 | 7/2003 | Morrow et al. | 337/381 |
| 6,786,421 B2 | 9/2004 | Rosen | 236/94 |
| 2005/0040247 A1 * | 2/2005 | Pouchak | 236/44 C |
| 2005/0040248 A1 | 2/2005 | Wacker et al. | |
| 2005/0040249 A1 * | 2/2005 | Wacker et al. | 236/51 |
| 2005/0120012 A1 * | 6/2005 | Poth et al. | 707/3 |
| 2007/0114295 A1 | 5/2007 | Jenkins | |

\* cited by examiner

*Primary Examiner*—Chen-Wen Jiang
(74) *Attorney, Agent, or Firm*—Bernhard P. Molldrem, Jr.

(57) ABSTRACT

A programmable thermostat can be programmed and configured using a set up selector keys or pushbuttons to enter set up modes and to move from screen to screen on the thermostat display, and using up and down selector keys to change the time and temperature settings within each screen or mode. The thermostat can be set into a master mode be depressing two of the selector keys simultaneously, and then the programmed settings of the thermostat can be electronically transferred to each of a batch of similar thermostats using a thermostat conductor in a multi-conductor thermostat wire such as the fan conductor. The thermostat can be toggled back to a normal or target mode for thermostat operation.

10 Claims, 2 Drawing Sheets

RECONFIGURABLE PROGRAMMABLE THERMOSTAT

BACKGROUND OF THE INVENTION

This invention relates to control devices for controlling the temperature, humidity, and/or other environmental conditions in an interior comfort space, and is more particularly concerned with an improvement to a wall thermostat. The invention is more particularly concerned with reconfigurable programmable thermostats, in which the settings for various heating and cooling modes can be programmed in and stored in an onboard microprocessor in the thermostat.

Wall thermostats are typically mounted on an interior wall of a house or other building to control the operation of a furnace, air conditioner, heat pump, or other environmental control apparatus. The thermostat is designed for continuous monitoring of room temperature and for adjusting the operation of the associated environmental control apparatus to keep the interior comfort space parameter (e.g., temperature) within in a temperature zone that is pre-set on the thermostat for a given day, time of day, or condition. In some applications, the thermostat may also be sensitive to other parameters, such as humidity or particulate level. The thermostat is connected to the furnace, air conditioner, and/or heat pump or the like by means of a run of thermostat wires which are connected to appropriate contacts or terminals on a terminal block inside the thermostat housing. There is typically at least a pair of conductors, and corresponding terminals on the terminal block, for the 24 volt AC thermostat power. There are usually several other terminals, also, to be connected via additional thermostat wire conductors to the furnace, air conditioner, heat pump, etc. A terminal is provided for the furnace and air conditioning indoor fan, for fan-only operation, and this is usually connected to a fan wire, i.e., a conductor identified with green-colored insulation.

The typical process of programming a configurable and programmable thermostat involves setting the thermostat into a program mode by pushing one or more keys or buttons, and then effecting the time and temperature setting for each mode before advancing to the next mode. The set up operation for a room thermostat can take fifteen or twenty minutes for each room thermostat. Usually, in a large construction operation where a large number of residential or office units are each being provided with an independent thermostat, an electrician installs the thermostats by connecting the thermostat wires, and then an HVAC specialist has to establish the settings on each and every one of the thermostats. This is a time consuming and rather tedious operation, and also requires a high-value employee to carry out the programming. At the same time, because the settings all have to be made manually, this is a source for human error.

OBJECTS AND SUMMARY OF THE INVENTION

Accordingly, it is an object of the present invention to provide an improvement to a wall thermostat that overcomes the above-mentioned drawback(s) of the prior art.

It is another object to provide an effective solution to the above-mentioned problems, which solution is straightforward and is simple to carry out.

It is a more specific object to provide a programmable, configurable thermostat that permits transfer of its program and configuration, i.e., the times and temperature settings from one thermostat to another directly, and without having to manually enter all the settings into each thermostat.

It is yet another object to provide a thermostat that can be configured as a master to transfer all settings to other thermostats, and which can be configured to a normal setting thereafter.

In accordance with one aspect of the present invention, a thermostat is adapted for mounting on a wall of a controlled space. The thermostat has a front cover and a back plate adapted to be mounted on the interior wall. The thermostat is programmable and reconfigurable such that settings can be programmed using program selection, mode selection, and setting selection keys on the thermostat. The thermostat can be configured such that settings for the thermostat can be transmitted and copied electronically into any number of similar thermostats. The thermostat has a wiring terminal block having at least two terminals adapted to receive and connect to thermostat wire conductors. In a preferred mode, three terminals (two power terminals and the fan terminal) are used. The thermostat also has a temperature sensor, preferably a solid state device, and a microprocessor that is coupled to the wiring terminals and to the temperature sensor. This microprocessor has a number of thermostat functionalities included in it, such as a clock for tracking time of day and day of week, and a mechanism for sending signals to the appropriate wiring terminals to turn on and off room comfort apparatus, such as furnace, heat pump and/or air conditioner. The operation of these apparatus are controlled in accordance with the temperature that is sensed and settings that are programmed in and stored. An LCD, flat panel, or other display device on the thermostat shows the room temperature in normal operation, but also is used for showing modes and settings of said thermostat during programming. As aforesaid, the thermostat has a number of selector keys and these are coupled to the microprocessor to permit a user to switch into each of the various modes and to also to adjust time (day of week and hour+minute) and temperature settings in each of the modes.

In order to carry out the transference of settings from one thermostat to another, the thermostat is provided with a mechanism for establishing a master mode and a target mode. When the thermostat is in the master mode it can be used to transfer its settings to the other thermostats. In this mode, the two or three terminals that are identified for this function are connected, using e.g. an ordinary short length of thermostat wire, to the like terminals on a second thermostat, i.e., a target thermostat. Electrical contact of the at least two terminals of the thermostat to similar terminals of this second, similar thermostat which is in the target mode electronically transfers the settings of the first-mentioned thermostat into the microprocessor of the second thermostat. This process takes about six seconds, as compared with fifteen to twenty minutes that are required in manually entering the settings using the selector keys.

In a preferred version of the thermostat, the microprocessor has embedded software responsive to actuation of a mode select key(s) to set the thermostat into a configuration mode, producing a series of setup screens on the display. Then the microprocessor is responsive to an advance key to advance from each of said setup screens to a subsequent setup screen, and to one or more setting select keys to select time and/or temperature settings within each of the setup screens.

The thermostat can have a built-in delay timer, so that in an air conditioning mode or heat pump mode, the thermostat delays a second actuation or re-start of the compressor following a de-energization or power down of the compressor.

The thermostat can have operating modes including at least one heat stage mode, at least one cooling stage mode, and a program mode. There can also be a lockout feature to prevent tampering with the settings after programming is complete, achieved by depressing certain selector keys and holding them for a short period of time.

An internal battery can power the microprocessor and display when the thermostat is not connected to a thermostat power source.

In a preferred version, the mechanism on the thermostat for establishing a master mode and a target mode involves depressing two of the selector keys simultaneously and holding them in for a predetermined time, e.g., six seconds. This sets the thermostat into the master mode, so it can be used for establishing setting electronically on all the other, i.e., target thermostats. Repeating this same procedure toggles the thermostat back to the target mode. When the thermostat is in its master mode, the LCD display shows a predetermined master mode indication, e.g., OUT (or output). When the thermostat is in the target mode, and is in the process of receiving settings that are being electronically transferred from another thermostat set in its master mode, the display on the target thermostat shows a download indication. In a practical application, this can be a stream of numbers that count up from zero to fifty as the data are transferred. Then, when transfer is complete, the display of the target thermostat shows a download completed indication, e.g., a padlock symbol to indicate the settings are now "locked." Alternatively, a word such as DONE can appear. Of course, other displays can be used instead.

In place of the LCD display and discrete selector keys, the thermostat may employ a touch screen display, where a portion of the display shows the various modes as settings are entered, and soft keys appear on another part of the touch screen for advancing from mode to mode and for changing the settings.

Once the thermostats are set up, they sense the room air parameters for their respective controlled space, e.g., temperature or humidity, much more accurately, and permit the furnace, air conditioner, heat pump, or other environmental control equipment to keep the interior room air within the comfort range(s) set on the device.

The above and many other objects, features, and advantages of this invention will be more fully appreciated from the ensuing description of certain preferred embodiments, which are to be read in conjunction with the accompanying Drawing.

DETAILED DESCRIPTION OF THE PREFERRED EMBODIMENT

Figure 1:
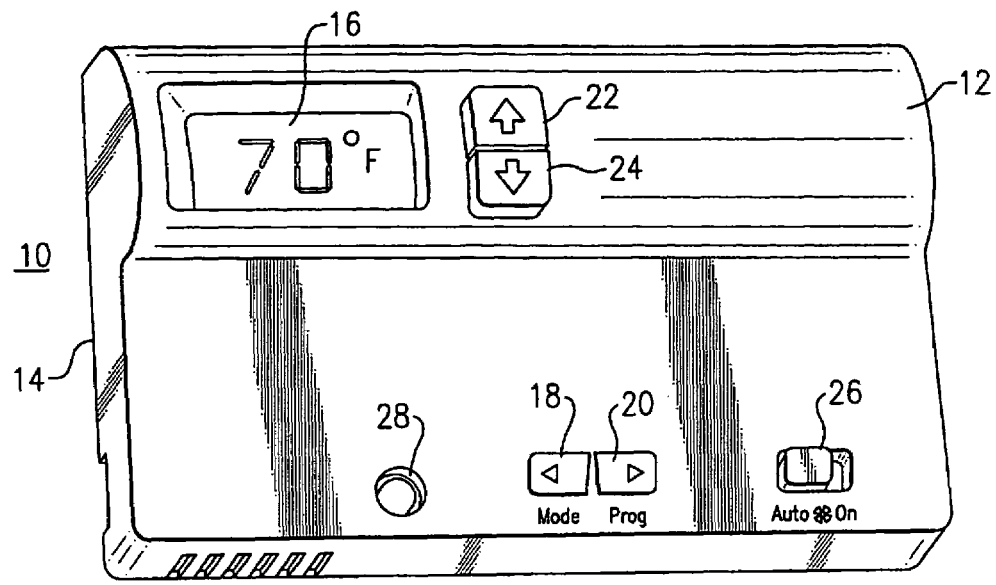
FIG. 1 is perspective view of a programmable, configurable thermostat according to an embodiment of the present invention.

With reference now to the Drawing, FIG. 1 shows a configurable, programmable wall thermostat unit 10 that is to be mounted onto a wall of a room of a dwelling, commercial building, or other structure where a human comfort space is to be maintained within some desired range of temperature. Here the thermostat 10 has a front cover 12 which fits onto a back plate 14. There are sensors, switches, and electrical and electronic components mounted on the back plate 14, which elements are known. Here, an LCD display 16 appears through an opening in the cover 12. There are a mode select key 18 and a program select key 20, here with left and right direction arrows, respectively. Near the display 16 there are up and down setting select keys 22 and 24, with up and down direction arrows, respectively. A slide switch 26 can be used to switch between an automatic fan mode where the fan blows during a heating or cooling cycle, and a fan on mode in which the fan blows continuously. Also shown here is an indicator lamp or LED 28, which can be programmed to flash to indicate some event, e.g., a system failure or problem.

Figure 2:
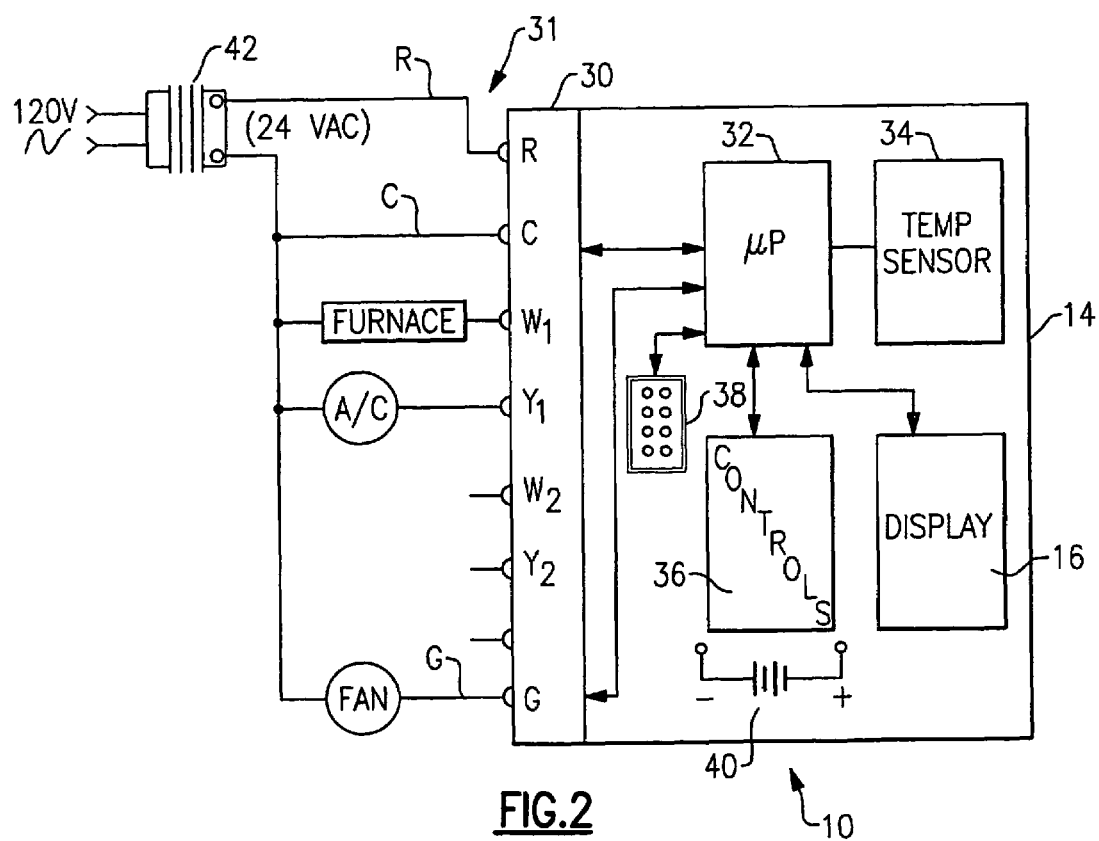
FIG. 2 is an general schematic view of the thermostat of this embodiment.

As shown schematically in FIG. 2, the thermostat has various elements mounted on the back plate 14, including a terminal block or contact strip 30, with a number of terminal connectors or contacts, here labeled with the letter identifiers for various conductors in a multiconductor thermostat wire 31, including as a minimum an R (thermostat power return conductor) terminal and C (common conductor) terminal, across which thermostat power (usually 24 volts AC) is applied. In the illustrated embodiment, the terminal block 30 also has a furnace terminal W1, air conditioning terminal T1, and various others such as a fan terminal G. Here the indicator G stands for "green" which is the conventional designation, and is the insulation color for the fan conductor.

A microprocessor 32, typically a multi-pin integrated circuit, contains various processor and memory modules within it, and a programmable ROM that contains software for carrying out the various control functions as needed. The microprocessor also includes a clock and day of week feature. The microprocessor has connections at least to one of the power contact terminals R, C. In this embodiment, the fan terminal G is employed as the data transfer terminal, and the microprocessor is also coupled to the G terminal. The thermostat further has the display 16 plus any associated drive circuitry coupled to the microprocessor 32. There is a solid-state temperature sensor 34 mounted on the back plate 14 and supplying a room (ambient) temperature input to the microprocessor 32. In some thermostats, this can be a remote sensor. A control module 40 couples the select keys 18, 20, 22, 24 to the microprocessor to permit set-up and programming of the thermostat. An optional jumper board 38 permits various reconfigurations of the thermostat, and this may employ either wire jumpers plugged into the board or mini switches. A back up battery 40 provides back up DC power to keep time and calendar in the event of a power outage or other problem.

As is typical in most thermostat installations, a thermostat transformer 42 provides the twenty-four volt (nominal) AC power along the R and C conductors of the thermostat wire 31, and this thermostat power is provided to turn on and off the furnace, air conditioner, heat pump, fan, and other comfort control equipment, under command of the thermostat.

Figure 3:
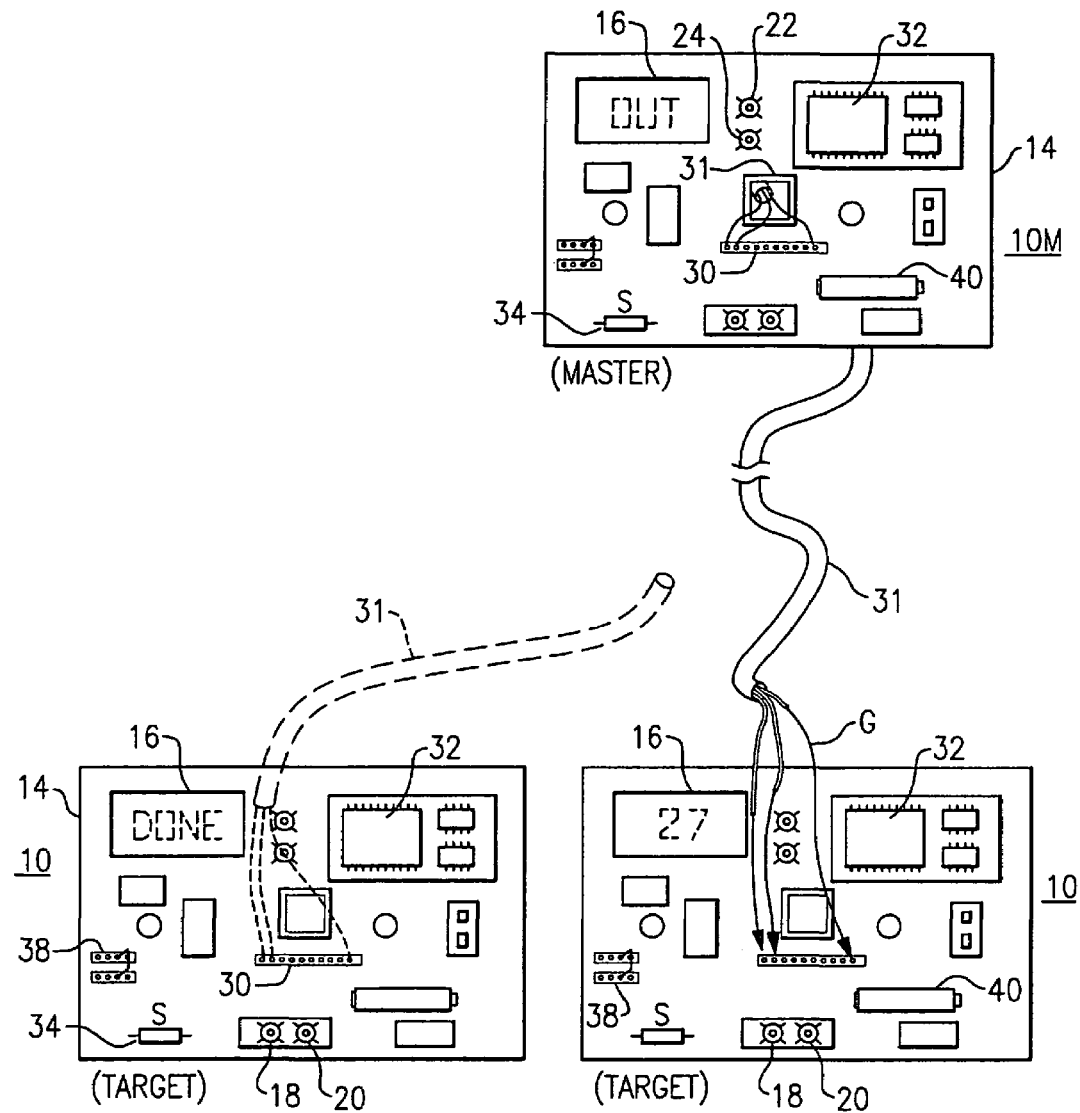
FIG. 3 shows a set of thermostats of this embodiment, with one serving as master and two others as target thermostats, wherein the settings of the master thermostat are electronically transferred over a short length of thermostat wire to each of the target thermostats.

FIG. 3 shows a number of the thermostats 10 (here, three are shown), each embodying the present invention, and respectively configured in a master mode and in a target mode. The target, or standard mode thermostats (below in this view) are identified as 10, and the master thermostat (shown above) is identified as 10-M. These are structurally identical, except that the master thermostat 10-M has been configured and programmed with the temperature and time settings that are to be transferred to the other, i.e., target thermostats 10, and the thermostat 10-M has been set into a master mode.

Here each of the thermostats 10-M, 10, 10 is shown with the front cover removed, although in practice, the cover 12 could remain in place at least on the master thermostat 10-M. Each has the display 16, microprocessor 32, temperature sensor 34, terminal block 30, and set up select keys 22, 24 and 18, 20, as described above, as well as other elements as previously mentioned.

Initially, thermostat power may be provided to the R and C terminals of the thermostat 10-M, which is then set into a programming mode, and the technician enters all the various settings for each of the mode or set up screens that appear on the display 16. This may include temperature settings for various times of day for each day of the week, for heat and air conditioning modes, as well as establishing temperature swing (between turn on and shut off), maximum heat temperature, minimum cooling temperature, and other factors. This typically requires advancing from mode to mode and establishing the settings in each mode, and can take an experienced technician a quarter hour or more. Consequently, where there are a number of thermostats to be configured the same and programmed with the same settings, it would be useful to reduce this time, at least for the second and third through nth thermostats 10. In this embodiment, the thermostat 10-M, once programming is complete, is set into a master mode by depressing certain ones of the select keys in a predetermined manner. In this embodiment, the technician depresses the up and down keys 22, 24 simultaneously, and holds them for six seconds. At that time the display reads "OUT" to indicate a data output mode, or master mode. Later, when the technician has finished setting up the target thermostats and downloading all the settings, the same procedure (here, depressing and holding the keys 22 and 24) is used to toggle the thermostat back to a normal (i.e., target) mode. The display will then show the ambient temperature.

After each of the target thermostats 10 has been installed at its respective comfort space, and has been connected with the respective thermostat wire to the local thermostat transformer, furnace, air conditioner, etc., the technician or other worker can simply transfer the settings electronically from the master thermostat 10-M. The technician carries the master thermostat with him into the location of the target thermostat. A short length of ordinary thermostat wire 31 is attached at one end to the terminal block 30 of the master thermostat 10-M. Here, there are three conductors used, namely the two power conductors R and C, and the fan or green conductor G. As aforesaid, the data terminal of the microprocessor 32 is coupled to the G terminal and that is employed for sending and receiving data. The R, C and G conductors are then contacted with the R, C and G terminals in the target thermostat 10, e.g., as shown on the right in FIG. 3. The R and C conductors provide power to the master thermostat, and the green conductor brings the data, containing all the programming data from the first, i.e., master thermostat 10-M, to the target thermostat 10. As the setting and programming data are accepted into the microprocessor 32 of the target thermostat, the display 16 of that thermostat 10 begins to count up, e.g., from "1" to "50", showing the progress of the download. This process takes approximately six seconds. When the downloading of the programming data is complete, the display can show a download complete indication, such as the term "DONE" as shown on the left target thermostat. Alternatively, in some preferred arrangements, the display 16 may show an image of a padlock to represent that the settings are now locked into the microprocessor memory. The cover 12 is then pushed into place on the back plate 14.

After the target thermostat has been programmed, the settings may be adjusted as desired by the user. Alternatively, the thermostats can be set into a lock mode wherein the settings may not be adjusted except by first entering a code.

Finally, when all the thermostats have been programmed, the master thermostat 10-M is switched back into a normal, i.e., target mode, and then it can be installed in one of the residential or commercial units as a normal thermostat.

The initial configuration of the thermostat to match the particular heating and cooling system involves entering the configuration mode from an off mode, typically by holding down two select keys simultaneously. The keys 18, 20 advance the configuration set up to the next screen or return to a previous screen, and the keys 22, 24 are used for changing the settings within each screen. In a typical thermostat, there may be fifteen different screens in the configuration mode, i.e. heat pump on/off; reversing valve on/off; heat=electric/oil/gas; differential or "swing"—number of degrees between turn on and set point; deadband—minimum number of degrees between heating system activation and cooling system activation; fan on delay time and fan off delay time for heat and cooling cycles; maximum number of compressor cycles per hour; temperature scale (F or C); status indicator (conditions for lighting the LED 28); lockout (number of degrees temperature may be changed from program temperatures); maximum heat set point; and minimum cooling set point. After these settings have been entered, the keys 18, 20 are used to advance into the programming mode.

In the program mode, the advance select key 20 is pressed twice to display the day of week (Day 1 through Day 7). Typically 1=Monday, 2=Tuesday, etc. The keys 22, 24 are used to advance to the next day or return to previous day. The advance key 20 is used to advance to the next screen. There are typically four screens, MORN, DAY, EVE and NITE. In each of these screen, the set time is displayed, and this is changed using the up and down keys 22, 24. Then heat is displayed and the setting is also changed as desired using the same keys 22, 24. Cooling temperature is adjusted in like manner. A programmable fan command is displayed, and here it is possible to select automatic or continuous fan during this period. After the MORN period screens, these steps are repeated for DAY, EVE, and NITE. Using a Simpleset® feature the settings for Day 1 can be copied into all of Day 2 to Day 7. Alternatively, the same programming steps can be repeated for each of Day 2 to Day 7 where the heating and cooling requirements differ from one day to the next.

When all the foregoing configuration and programming steps have been carried out, the key 20 can be pressed and held down to exit the programming mode. Then the two keys 22, 24 can be depressed simultaneously and held down for six seconds, and the thermostat will be set into its master mode. This thermostat can then be used for establishing the configurations and settings on all the remaining thermostats by electronic transfer over a short length of ordinary thermostat wire, as describe just above.

As an alternative to carrying the master thermostat into each of the various comfort spaces to program the installed target thermostats, the master thermostat 10-M can be set up in a central shop area or location, and can be used to program each of the target thermostats 10 before they are taken to the work sites and installed.

Each of the thermostats 10 may favorably include a protective feature to delay the restart of an air conditioning compressor until some predetermined delay time (e.g., four minutes) has elapsed since the compressor was most recently shut off. This feature permits head pressure in the air conditioner compressor to decay after each use to prevent damage to the compressor on start up. The technician can bypass this feature for installation and testing.

A simple jig or three-point connector could be easily constructed to attach to the short stretch of thermostat wire to contact the three points, i.e., the R, C and G terminals of the thermostats, if desired. However, the thermostat wire is sufficient for making contact during the time that the program is transferred from the master to the target thermostat.

While the invention has been described with reference to specific preferred embodiments, the invention is certainly not limited to those precise embodiments. Rather, many modifications and variations will become apparent to persons of skill in the art without departure from the scope and spirit of this invention, as defined in the appended claims.

We claim:

1. A programmable and reconfigurable thermostat in which settings can be programmed and which is adapted for copying the settings of the thermostat electronically, thermostat-to-thermostat, directly onto any of a plurality of similar thermostats, the thermostat comprising:

A wiring terminal block having at least two terminals adapted to receive and connect to thermostat wires that provide thermostat power to room comfort apparatus to turn the room comfort apparatus on and off;

A temperature sensor;

A microprocessor coupled to the at least two terminals and to the temperature sensor, including a clock for tracking time of day and day of week, and capable of connecting the thermostat power to said terminals to turn on and off one or more room comfort apparatus in accordance with the temperature sensed at said temperature sensor and settings stored in said microprocessor;

A display for showing a plurality of modes and respective time and temperature settings of said thermostat;

A plurality of selector keys coupled to said microprocessor permitting a user to switch into each of a plurality of modes and to adjust program time and temperature settings; and Means for establishing a data output mode and a target mode, whereby when in the data output mode electrical contact of the at least two terminals of the wiring terminal block of the thermostat directly to similar terminals of a wiring terminal block of a second one of said similar thermostats, by means of temporary connection of thermostat conductor wires, when the latter thermostat is in the target mode electronically transfers the settings of the first-mentioned thermostat via said temporary connection of thermostat conductor wires into the microprocessor of the second thermostat.

2. The thermostat according to claim 1, wherein said microprocessor includes software stored therein responsive to actuation of selected ones of said plurality of selector keys, namely, responsive to a mode select key to set the thermostat into a configuration mode, producing a series of setup screens on said display, responsive to an advance key to advance from each of said setup screens to a subsequent setup screen, and to one or more setting select keys to select time and/or temperature settings within each of said setup screens.

3. The thermostat according to claim 1, wherein for an air conditioning mode or heat pump mode, the thermostat further includes time delay means providing a time delay for actuation of a compressor following a de-energization of the compressor.

4. The thermostat according to claim 1, wherein the thermostat has operating modes including at least one heat stage mode, at least one cooling stage mode, and a program mode.

5. The thermostat according to claim 1, further comprising a lockout feature to prevent tampering with the settings after programming is complete wherein further adjustment of said settings can only be enabled by entering an enable code on said selector keys.

6. The thermostat according to claim 5, further comprising an internal battery for powering the microprocessor and display when the thermostat is not connected to a thermostat power source.

7. The thermostat according to claim 1, wherein said wiring block has at least three terminals including first and second terminals to be connected to receive thermostat power, and a third terminal, wherein the third terminal is adapted for data transfer to communicate the settings of the first-mentioned thermostat that is in the data output mode to the microprocessor of the second thermostat.

8. The thermostat according to claim 1, wherein said means for establishing the data output mode and the target mode includes a facility coupled to two of said plurality of selector keys, wherein actuating said two keys simultaneously toggles the thermostat between its data output mode and its target mode.

9. The thermostat according to claim 1, wherein when said thermostat is in its data output mode, said display shows a predetermined data output mode indication.

10. The thermostat according to claim 1, wherein when said thermostat is in its target mode and is receiving settings being electronically transferred directly from another thermostat set in its data output mode, said display shows a download indication, and when said transfer is complete, said display shows a download-completed indication.

* * * * *